United States Patent
Lee et al.

(10) Patent No.: US 7,775,701 B2
(45) Date of Patent: Aug. 17, 2010

(54) BACKLIGHT ASSEMBLY AND DISPLAY DEVICE HAVING THE SAME

(75) Inventors: Yong-Woo Lee, Suwon-si (KR); Seong-Sik Choi, Seoul (KR); Cheol-Yong Noh, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 23 days.

(21) Appl. No.: 12/172,671

(22) Filed: Jul. 14, 2008

(65) Prior Publication Data
US 2009/0168454 A1 Jul. 2, 2009

(30) Foreign Application Priority Data
Dec. 31, 2007 (KR) .................. 10-2007-0141564

(51) Int. Cl.
*F21V 7/04* (2006.01)
(52) U.S. Cl. .................. 362/633; 362/632; 362/634
(58) Field of Classification Search .......... 362/632–634
See application file for complete search history.

(56) References Cited

U.S. PATENT DOCUMENTS

| | | | | |
|---|---|---|---|---|
| 7,106,393 B2* | 9/2006 | Lee | ............... | 349/58 |
| 7,414,680 B2* | 8/2008 | Lee et al. | ............... | 349/58 |
| 7,441,937 B2* | 10/2008 | Cho et al. | ............... | 362/633 |
| 2006/0119761 A1* | 6/2006 | Okuda | ............... | 349/58 |

FOREIGN PATENT DOCUMENTS

| | | |
|---|---|---|
| JP | 2004-240239 | 8/2004 |
| KR | 1020040097092 A | 11/2004 |
| KR | 1020060037752 A | 5/2006 |

\* cited by examiner

*Primary Examiner*—Anabel M Ton
(74) *Attorney, Agent, or Firm*—Cantor Colburn LLP (57) ABSTRACT

A backlight assembly includes a light source, a light-guide plate and an integrally formed frame. The light-guide plate guides light generated from the light source. The integrally formed frame includes a chassis and a mold frame integrally combined with the chassis as an indivisible unitary element through insert/outsert injection. The integrally formed frame receives the light source and the light-guide plate. A hemming part is formed on a sidewall of the chassis to increase strength of the integrally formed frame. Therefore, the number of elements is decreased, and strength against bending stress, impact resistance and heat dissipation are improved.

20 Claims, 6 Drawing Sheets

BACKLIGHT ASSEMBLY AND DISPLAY DEVICE HAVING THE SAME

The present application claims priority to Korean Patent Application No. 2007-141564, filed on Dec. 31, 2007, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly and a display device having the backlight assembly. More particularly, the present invention relates to a backlight assembly capable of providing light to display an image and a display device having the backlight assembly.

2. Description of the Related Art

The demand for electronic devices being thin and lightweight is increasing for mobile devices such as notebook computers. Thus, mobile display devices, such as the notebook computers, are being developed to be thinner and lighter weight.

Nowadays, the thickness of a glass used for a display panel of a display device is decreased, a top chassis is removed from the display device, or a cold cathode fluorescent lamp ("CCFL") is substituted with a light-emitting diode ("LED"). Thus, the thickness and the weight of the display device are decreased.

However, when the thickness of the glass for the display panel is decreased through an etching or a grinding process, costs of the display device are increased and the strength of the display device is decreased. Also, when the top chassis is removed from the display device, the strength of the display device is decreased and fabrication of the display device becomes more complicated.

In addition, when the thickness and the weight of the display device are decreased, the strength of the display device is decreased and the manufacturing cost may be increased by additional processing. Further, the display device may not be easily fabricated, thus increasing the amount of time necessary for manufacturing. Furthermore, reinforcement of the display device or an external case may be required for the display device, and an additional fabrication device may be required to improve the fabrication of the display device. Therefore, market competitiveness of the display device may deteriorate for all of the above reasons.

BRIEF SUMMARY OF THE INVENTION

Exemplary embodiments of the present invention provide a backlight assembly having a thin thickness and light weight which improves strength, fabrication and quality of a display device in which it is disposed.

Exemplary embodiments of the present invention also provide a display device having the above-mentioned backlight assembly.

A backlight assembly in accordance with an exemplary embodiment of the present invention includes a light source, a light-guide plate and an integrally formed frame. The light-guide plate guides light generated from the light source. The integrally formed frame includes a chassis and a mold frame integrally combined with the chassis as an indivisible unitary element through insert/outsert injection. The integrally formed frame receives the light source and the light-guide plate. A hemming part is formed on a sidewall of the chassis to increase strength of the integrally formed frame.

The chassis may include a bottom plate having an opening at a central portion of the bottom plate and the sidewall extended from a side of the bottom plate in a vertical direction of the chassis, and the hemming part is bent from an upper portion of the sidewall toward the bottom plate to be overlapped with the sidewall. The hemming part may be formed on three sidewalls of four sidewalls defining the sidewall of the chassis except one sidewall that is adjacent to the light source.

The chassis may include a bottom plate having an opening at a central portion of the bottom plate, the sidewall extended from a side of the bottom plate in a vertical direction of the chassis, and a protrusion protruded from an upper portion of the sidewall in a direction substantially parallel with the bottom plate to receive the light-guide plate. The protrusion may be adjacent to the light source.

The chassis may have a plurality of holes to increase an adhesive strength between the mold frame and the chassis.

A user hole may be formed through the sidewall of the chassis so that the chassis may be combined with a case through the user hole.

The light source comprises a plurality of light-emitting diodes ("LEDs"). Alternatively, the light source may include at least one fluorescent lamp.

A display device in accordance with another aspect of the present invention includes a light source, a light-guide plate, an integrally formed frame, a display panel and an adhesive member. The light-guide plate guides light generated from the light source. The integrally formed frame includes a chassis and a mold frame integrally combined with the chassis as an indivisible unitary element through insert/outsert injection. The integrally formed frame receives the light source and the light-guide plate. A hemming part is formed on a sidewall of the chassis to increase strength of the integrally formed frame. The display panel is received in the integrally formed frame on the light-guide plate to display an image based on the light exiting from the light-guide plate. The adhesive member fixes the display panel to the integrally formed frame.

According to the present invention, the backlight assembly includes the integrally formed frame structure, so that the number of parts defining the frame structure is decreased from three to one, and strength against bending, impact resistance, and heat dissipation of the frame structure are improved. Also, a top chassis may be eliminated and the backlight assembly may have a side user hole structure. In addition, the thickness and the weight of the backlight assembly may be decreased.

BRIEF DESCRIPTION OF THE DRAWINGS

The above and other aspects, feature and advantages of the present invention will become more apparent by describing in further detail exemplary embodiments thereof with reference to the accompanying drawings, in which.

DETAILED DESCRIPTION OF THE INVENTION

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 1:
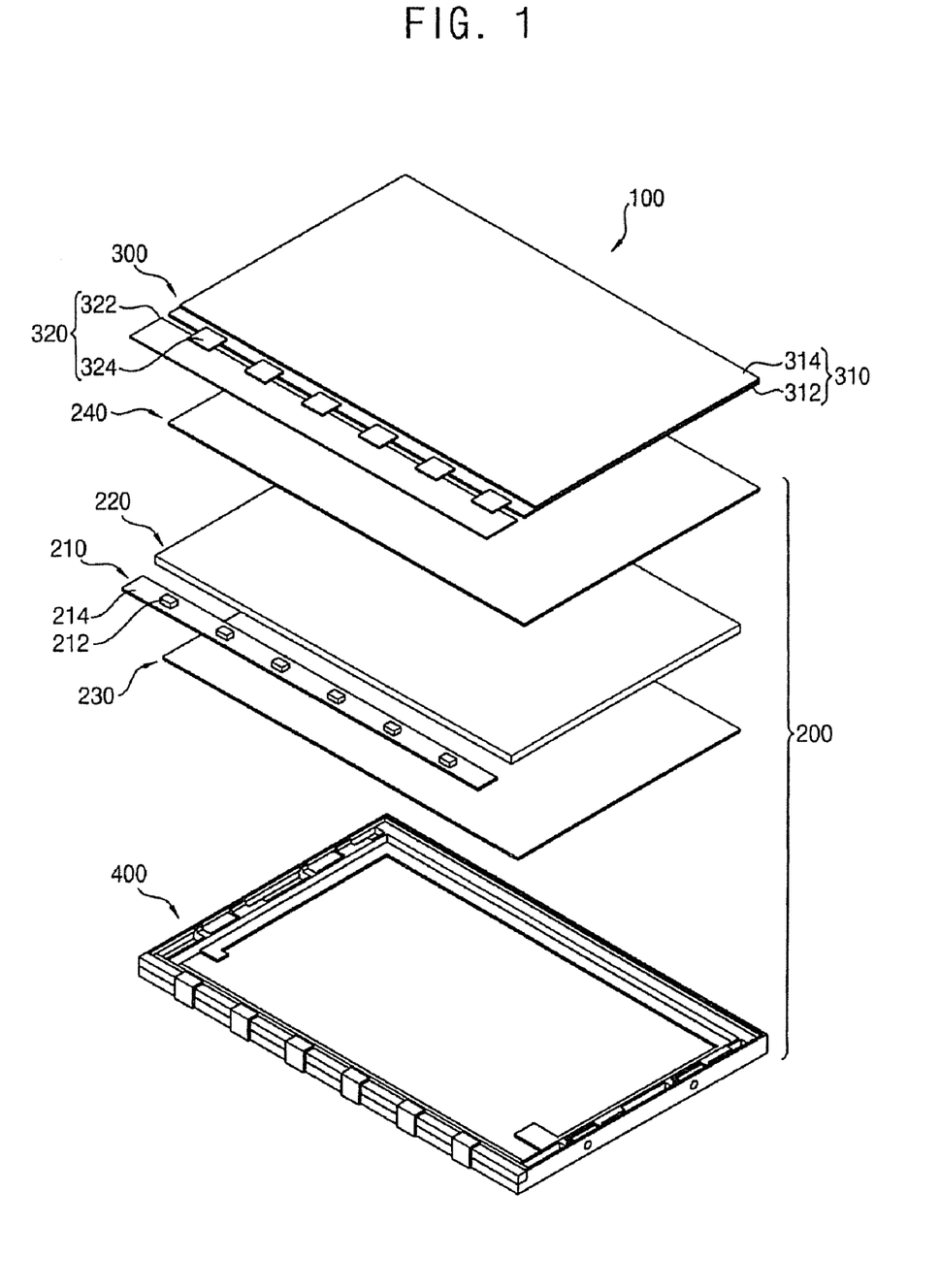
FIG. 1 is an exploded perspective view illustrating a display device in accordance with an exemplary embodiment of the present invention.
Figure 2:
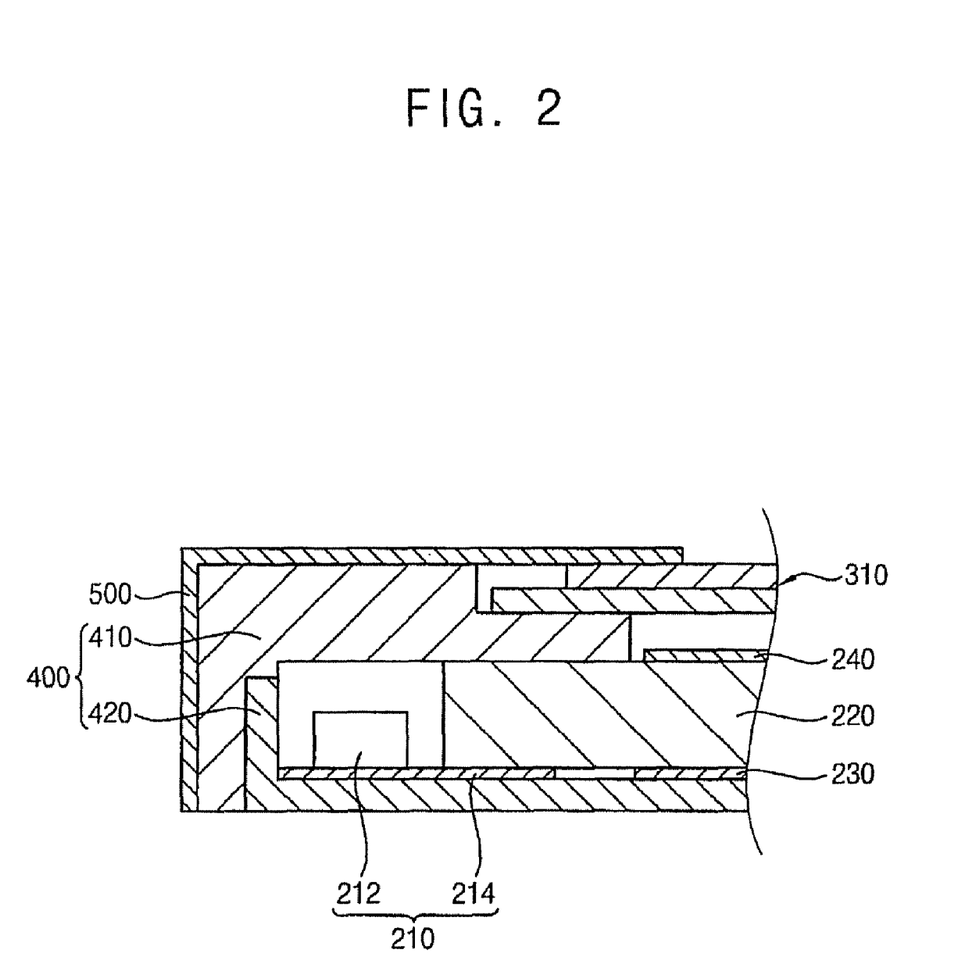
FIG. 2 is a cross-sectional view illustrating an assembled display device shown in FIG. 1.

FIG. 1 is an exploded perspective view illustrating a display device in accordance with an exemplary embodiment of the present invention. FIG. 2 is a cross-sectional view illustrating an assembled display device shown in FIG. 1.

Referring to FIGS. 1 and 2, the display device 100 includes a backlight assembly 200 providing light, and a display unit 300 displaying an image using the light provided from the backlight assembly 200.

The backlight assembly 200 includes a light source 210 generating light, a light-guide plate 220 and an integrally formed frame 400. The light-guide plate 220 guides the light generated from the light source 210 toward the display unit 300. The integrally formed frame 400 receives the light source 210 and the light-guide plate 220.

The integrally formed frame 400 includes a chassis 420 and a mold frame 410. The mold frame 410 may be combined with the chassis 420 through insert/outsert extrusion method. For example, the chassis 420 of metal is mounted on an injecting unit, and plastic resin is injected into the chassis 420 to form the mold frame 410, but is not limited thereto. Thus, the chassis 420 is integrally formed with the mold frame 410 to form the integrally formed frame 400 as an inseparable indivisible unitary part. A central bottom of the integrally formed frame 400 has an opening to decrease weight of the backlight assembly 200 and to increase heat dissipation therefrom.

The light source 210 may include a plurality of light-emitting diodes ("LEDs") 212 and a circuit board 214. The LEDs 212 are fixed to the circuit board 214, and the circuit board 214 applies an electric power to the LEDs 212. For example, the circuit board 214 may include a flexible printed circuit board ("FPCB"), but is not limited thereto.

The light source 210 is disposed on a longitudinal side of the light-guide plate 220 to supply the light-guide plate 220 with light. Alternatively, two light sources 210 may be disposed on corresponding sides of the light-guide plate 220.

The light source 210 is received in a light source receiving space defined between the mold frame 410 and the chassis 420. The light source 210 may be fixed to the chassis 420 using an adhesive tape or a screw.

The light-guide plate 220 guides the light from the light source 210 disposed on the side of the light-guide plate 220 toward an upper surface of the light-guide plate 220 toward the display unit 300. The light-guide plate 220 includes a transparent material for guiding the light. Examples of the transparent material which may be used for the light-guide plate 220 include polymethyl methacrylate ("PMMA"), polycarbonate ("PC"), but is not limited thereto.

A reflective pattern (not shown) may be formed on a lower surface of the light-guide plate 220 to scatter the light. For example, the reflective pattern may include a printed pattern, a recess, or a protrusion, but is not limited thereto. The light incident into the light-guide plate 220 from the light source 210 is scattered and reflected from the reflective pattern, and a portion of the light, whose exiting angle is more than a critical angle with respect to a normal line of the upper surface of the light-guide plate 220, exits the light-guide plate 220 through the upper surface of the light-guide plate 220.

The backlight assembly 200 may further include a reflecting sheet 230 and at least one optical sheet 240. The reflecting sheet 230 may be disposed under the light-guide plate 220. The optical sheet 240 is disposed on the light-guide plate 220.

A portion of light leaked from the lower surface of the light-guide plate 220 is reflected from the reflecting sheet 230 to increase luminance of the backlight assembly 200. The reflecting sheet 230 includes a highly reflective material. Examples of the reflective material that may be used for the reflecting sheet 230 include polyethylene terephthalate ("PET"), polycarbonate ("PC"), but is not limited to the foregoing. Alternatively, the reflecting sheet 230 may have a laminated structure having a metal plate such as an aluminum sheet and a white sheet.

The reflecting sheet 230 is disposed under the light-guide plate 220 to cover the opening of the integrally formed frame 400. Thus, impurities may not flow into the backlight assembly 200 through the opening of the integrally formed frame 400.

The optical sheet 240 improves optical characteristics of the light exiting from the light-guide plate 220. The optical sheet 240 may include a diffusion sheet that diffuses the light to increase luminance uniformity. Also, the optical sheet 240 may further include a prism sheet that increases luminance when viewed from different angles. In addition, the optical sheet 240 may further include a protective sheet that protects the prism sheet. The backlight assembly 200 may further include various sheets.

The display unit 300 includes a display panel 310 and a driving circuit part 320. The display panel 310 displays an image using the light provided from the backlight assembly 200. The driving circuit part 320 drives the display panel 310.

The display panel 310 is received in the integrally formed frame 400 so that the light-guide plate 220 and the optical sheet 240 are disposed under the display panel 310. The display panel 310 includes a lower substrate 312, an upper substrate 314 and a liquid crystal layer (not shown). The upper substrate 314 is combined with the lower substrate 312. The liquid crystal layer is interposed between the upper substrate 314 and the lower substrate 312.

The lower substrate 312 includes a thin film transistor ("TFT") substrate that has a plurality of TFTs arranged in a matrix. Each of the TFTs includes a source electrode electrically connected to a data line, a gate electrode electrically connected to a gate line and a drain electrode electrically connected to a pixel electrode having a transparent conductive material.

The upper substrate 314 may include a color filter substrate having red, green and blue color filters of a thin film shape. The upper substrate 314 further includes a common electrode having a transparent conductive material. Alternatively, the color filter may be formed on the lower substrate 312.

When a voltage is applied to the gate electrode of the TFT of the display panel 310, the TFT is turned on, thereby generating an electric field between the pixel electrode and the common electrode. Liquid crystal molecules of the liquid crystal layer interposed between the lower substrate 312 and the upper substrate 314 vary arrangement in response to the electric field applied thereto. Thus, light transmittance of the liquid crystal layer is changed to display an image.

The driving circuit part 320 includes a source printed circuit board ("PCB") 322 and a driving circuit film 324. The source PCB 322 outputs control signals for driving the display panel 310. The driving circuit film 324 electrically connects the source PCB 322 to the display panel 310. The driving circuit film 324 may further include a driving chip which outputs data signals to the data line of the display panel 310 in response to the control signals applied from the source PCB 322. Alternatively, a gate driving part which outputs the gate signal applied to the gate line of the display panel 310 in response to the control signals applied from the source PCB 322 may be formed in the display panel 310. Alternatively, the gate driving part may have a thin film shape, and may be electrically connected to a gate side of the display panel 310.

The display panel 310 received in the integrally formed frame 400 is fixed to the integrally formed frame 400 through an adhesive member 500. For example, the adhesive member 500 may be an adhesive tape, such as black tape, for example, but is not limited thereto.

When the backlight assembly 200 includes the integrally formed frame 400 which is formed by injecting the resin into the metal chassis 420 to form the mold frame 410 in the metal chassis 420, elements such as a mold frame, a back cover, a top chassis, etc., are integrated into one indivisible unitary element which is the integrally formed mold frame 420. Thus, the backlight assembly 200 may be easily fabricated, and the thickness and the weight of the backlight assembly may be decreased.

Figure 3:
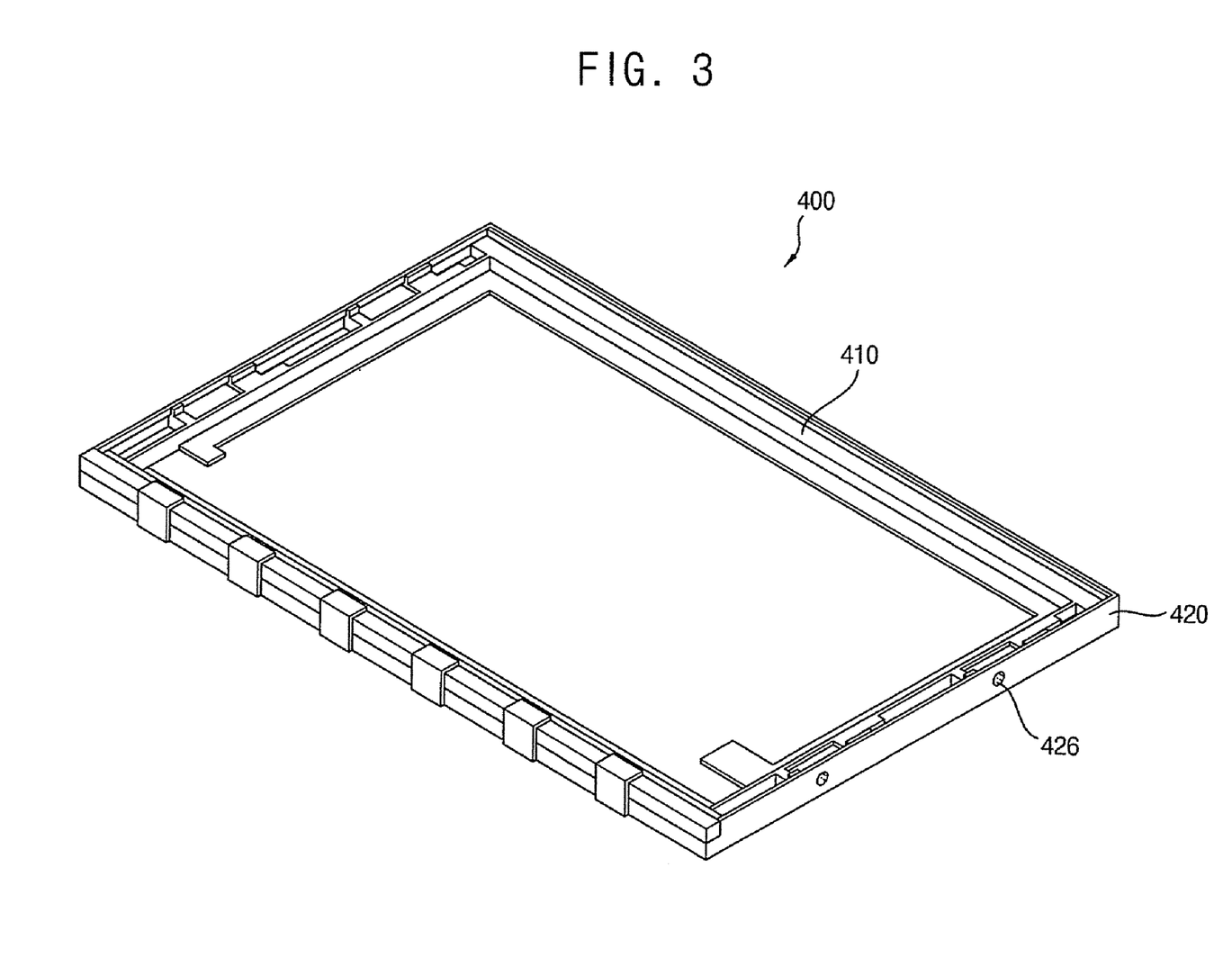
FIG. 3 is an enlarged perspective view illustrating an integrally formed frame shown in FIG. 1.
Figure 4:
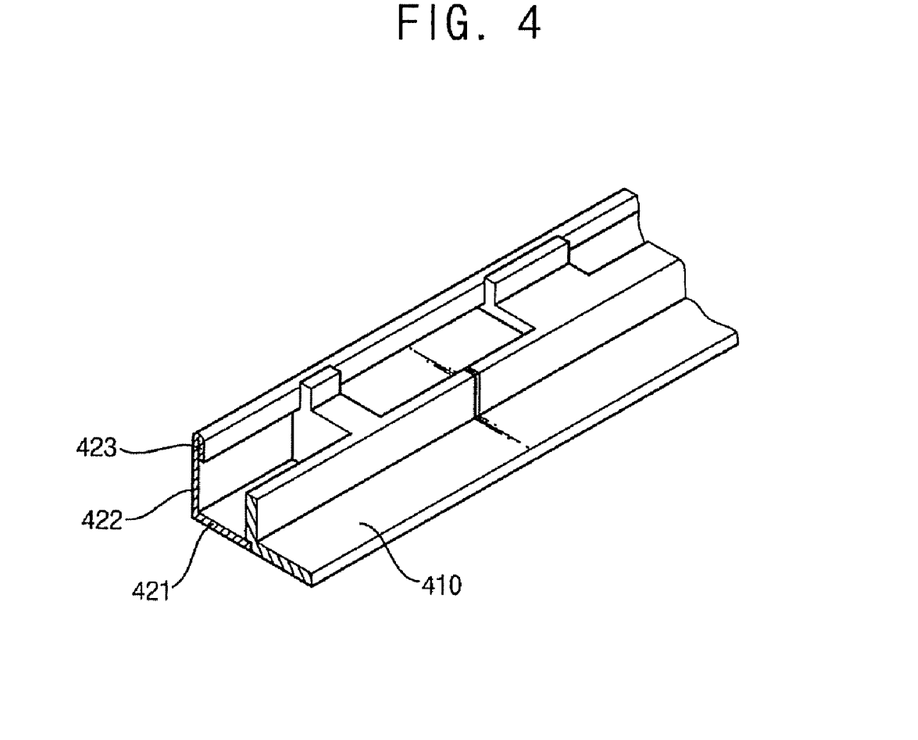
FIG. 4 is an enlarged perspective partial view illustrating a sidewall part of the integrally formed frame shown in FIG. 3.

FIG. 3 is a perspective view illustrating the integrally formed frame 400 shown in FIG. 1. FIG. 4 is an enlarged perspective partial view illustrating a sidewall part of the integrally formed frame 400 shown in FIG. 3.

Referring to FIGS. 3 and 4, the integrally formed frame 400 includes the chassis 420 and the mold frame 410. The mold frame 410 is combined with the chassis 420 through insert/outsert injection method.

The chassis 420 may have a rectangular frame shape. For example, the chassis 420 has a bottom plate 421 and a sidewall 422. The bottom plate 421 has an opening on a central portion of the bottom plate 421. The sidewall 422 is bent from sides of the bottom plate 421 in a vertical direction.

A hemming part 423 is formed on the sidewall 422 of the chassis 420 to increase strength of the integrally formed frame 400. For example, the hemming part 423 is extended from an upper portion of the sidewall 422 of the chassis 420 and is bent toward the bottom plate 421. The hemming part 423 may make contact with the sidewall 422. Thus, the hemming part 423 is overlapped with the sidewall 422 of the chassis 420 to double the strength of the chassis 420. For example, the hemming part 423 is formed on three sidewalls 422 of the four sidewalls 422 of the chassis 420 except one of the sidewalls 422, which is adjacent to the light source 210.

Figure 5A:
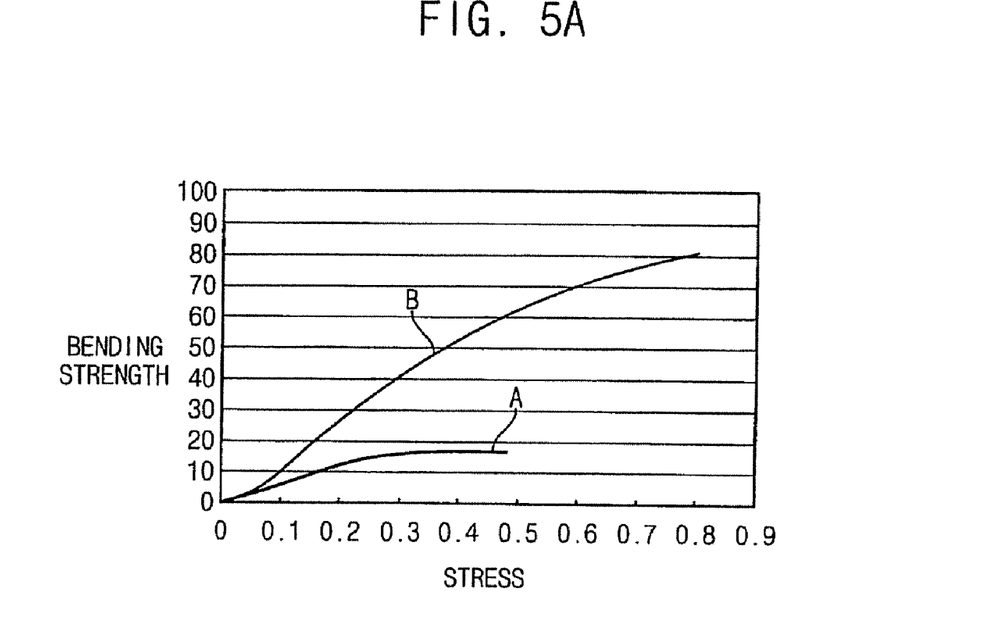
FIGS. 5A and 5B are graphs illustrating a relationship between a bending strength and a stress applied to the display device shown in FIG. 1.
Figure 5B:
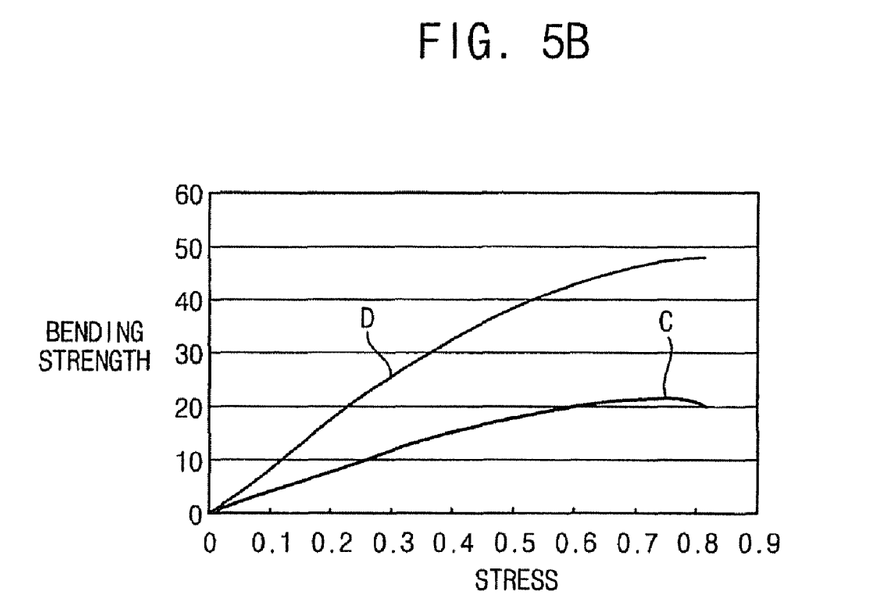

FIGS. 5A and 5B are graphs illustrating a relationship between a bending strength and a stress applied to the display device shown in FIG. 1. In FIG. 5A, the reference numeral 'A' represents a bending strength of a display device having a mold frame, a back cover and a top chassis along a longitudinal direction of the display device, as in the prior art. The reference numeral 'B' represents a bending strength of the display device having the integrally formed frame 400 shown in FIG. 3 along a longitudinal direction of the display device shown in FIG. 1. In FIG. 5B, the reference numeral 'C' represents a bending strength of a display device having the mold frame, the back cover and the top chassis along a horizontal direction of the display device, as in the prior art. The reference numeral 'D' represents a bending strength of the display device having the integrally formed frame 400 shown in FIG. 3 along a horizontal direction substantially orthogonal to the longitudinal direction of the display device shown in FIG. 1.

Referring to FIGS. 5A and 5B, the strength of the display device having the integrally formed frame 400 shown in FIG. 3 is greater than that of the display device having the mold frame, the back cover and the top chassis as in the prior art by about 75% in the longitudinal direction. The strength of the display device having the integrally formed frame 400 shown in FIG. 3 is greater than that of the prior art display device having the mold frame, the back cover and the top chassis by about 50% in the horizontal direction. When the strength of the display device having the integrally formed frame 400 shown in FIG. 3 is increased, yield of the display device in a hinge test, a twist test, etc., is greatly increased.

Figure 6:
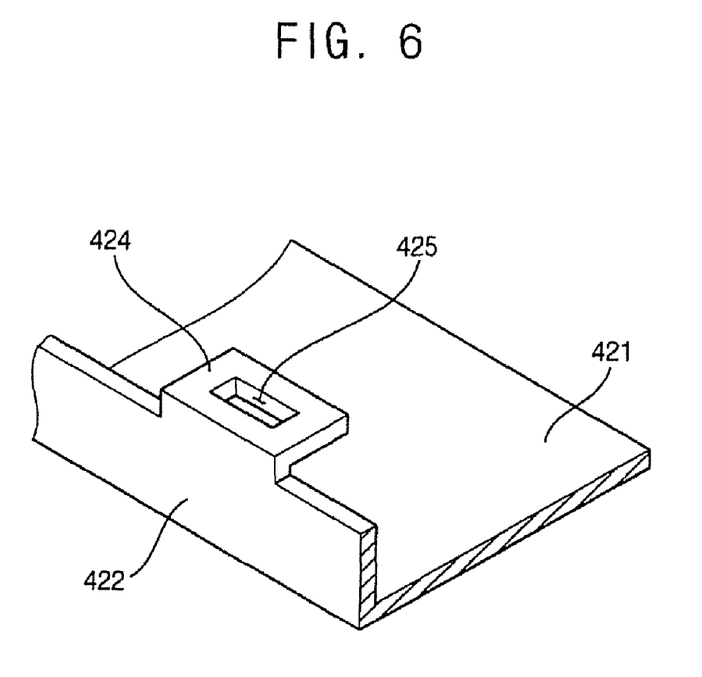
FIG. 6 is an enlarged perspective partial view illustrating the integrally formed frame shown in FIG. 3.

FIG. 6 is an enlarged perspective view illustrating the integrally formed frame 400 shown in FIG. 3.

Referring to FIGS. 2 and 6, the chassis 420 includes the bottom plate 421 having the opening on the central portion, and the sidewall 422 which is extended from the sides of the bottom plate 421. Also, the chassis 420 may further include at least one protrusion 424 to increase impact resistance of a receiving portion for receiving the light-guide plate 220.

The protrusion 424 of the chassis 420 is protruded from the upper portion of the sidewall 422 in a direction substantially parallel with the bottom plate 421 to receive the light-guide plate 220. For example, the protrusion 424 is formed on the sidewall 422 adjacent to the light source 210.

When the protrusion 424 for receiving the light-guide plate 220 is formed on a portion of the chassis 420 having the metal, the protrusion 424 securely holds the light-guide plate 220, thereby improving strength against bending stress of the backlight assembly 200. Also, when the strength of the backlight assembly 200 is increased, defects such as drifting of the light-guide plate 220 may be eliminated or effectively reduced. A light-guide plate stopper may be formed on a corner of the integrally formed frame 400 so that the light-guide plate 220 may not make contact with the LED 212.

A plurality of holes 425 may be formed through the chassis 420 to increase an adhesive strength between the chassis 420 and the mold frame 410. When the plastic resin is injected into the chassis 420 to form the mold frame 410 in the chassis 420, the plastic resin is filled in the holes 425, thereby increasing the adhesive strength between the chassis 420 and the mold frame 410. The holes 425 may be formed through the bottom plate 421, the sidewall 422 or the protrusion 425 of the chassis 420.

Referring again to FIG. 3, a user hole 426 for receiving a screw (not shown) may be formed through the sidewall 422 of the chassis 420, so that the integrally formed frame may be combined with a case (not shown) via the screw. For example, the user hole 426 may be formed through two horizontal sidewalls of the sidewalls 422 of the chassis 420.

In FIG. 3, the user hole is not formed on a side portion of the top chassis, but is formed through the sidewall 422 of the chassis 420. Thus, the sidewall 422 of the integrally formed frame may be combined with the case.

The chassis 420 includes steel electrogalvanized cold-rolled coil ("SECC") which has greater strength than aluminum. Alternatively, the chassis 420 may include aluminum. When the integrally formed frame 400 includes the chassis 420 having the SECC, the amount of heat dissipation of the chassis 420 may be increased compared with the back cover having the aluminum.

Table 1 below represents temperatures of various display devices. In Table 1, a display device 1 includes a top chassis having SUS409 stainless steel and a back cover having aluminum. A display device 2 includes an integrally formed frame having a chassis made of SECC. A display device 3 includes an integrally formed frame having a chassis made of SECC, a heat dissipation pad and an aluminum tape.

TABLE 1

|  | Display Device 1 | Display Device 2 | Display Device 3 |
|---|---|---|---|
| Max. LED Temp. (° C.) | 46.5 | 46.6 | 45.0 |
| Min. LED Temp. (° C.) | 41.1 | 39.3 | 39.0 |

Referring to Table 1, the maximum temperature of the LED of the display device 2 is substantially equal to that of the display device 1, and the minimum temperature of the LED of the display device 2 is lower than that of the display device 1 by about 2° C.

The maximum temperature of the LED of the display device 3 is lower than that of the display device 1 by about 2° C., and the minimum temperature of the LED of the display device 3 is lower than that of the display device 1 by about 1.5° C.

Figure 7:
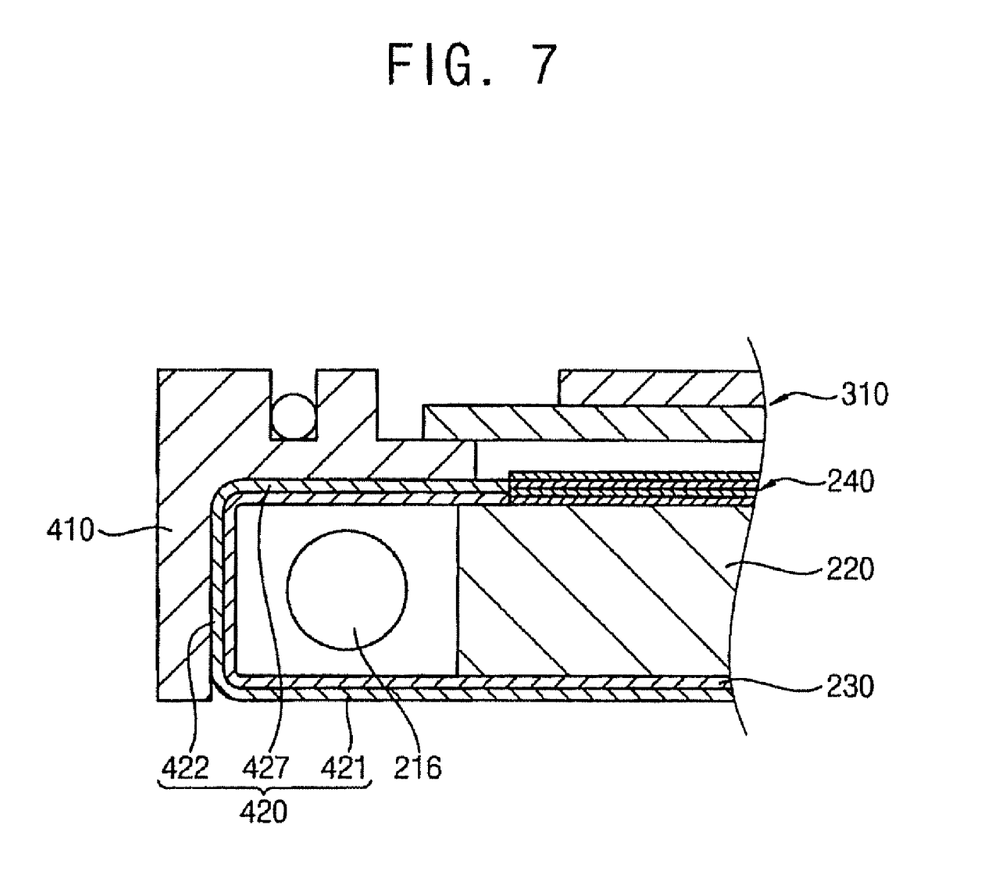
FIG. 7 is a cross-sectional view illustrating a display device in accordance with another exemplary embodiment of the present invention.

FIG. 7 is a cross-sectional view illustrating a display device in accordance with another exemplary embodiment of the present invention.

Referring to FIG. 7, the display device includes a fluorescent lamp 216 as a light source. The fluorescent lamp 216 may include a cold cathode fluorescent lamp ("CCFL") having a long cylindrical shape.

In FIG. 7, a chassis 420 of an integrally formed frame 400 includes a bottom plate 421, a sidewall 422 and a cover part 427. The bottom plate 421 of the chassis 420 has an opening on a central portion (shown in FIGS. 3 and 4). The sidewall 422 is bent from sides of the bottom plate 421 in a vertical direction of the display device. The cover part 427 covers an upper portion of the fluorescent lamp 216, and is extended in a direction substantially parallel with the bottom plate 421. The reflecting sheet 230 disposed on an inner surface of the chassis 420 under the light-guide plate 220 may be extended to cover the bottom plate 421, the sidewall 422 and the cover part 427.

When the chassis 420 of the frame 400 and the reflecting sheet 230 surround three sides of the lamp 216, a lamp cover (not shown) may be omitted.

The display device of FIG. 7 is substantially the same as shown in FIG. 1. Thus, any further repetitive explanations concerning the above mentioned elements will be omitted.

According to the present invention, a backlight assembly includes an integrally formed frame, so that additional elements such as a mold frame, a top chassis, a back cover, a lamp cover, etc., may be omitted. Thus, a thickness and weight of a display device may be decreased, and the display device may be easily fabricated. Also, a sidewall of the chassis has a hemming part for providing strength against bending stress and a protrusion for holding the light-guide plate, both of which improving impact resistance of the display device. Furthermore, the top chassis may be omitted, and the sidewall of the integrally formed frame may be combined with a case via a screw inserted into a user hole in the sidewall of the chassis.

The present invention has been described with reference to the exemplary embodiments. It is evident, however, that many alternative modifications and variations will be apparent to those having skill in the art in light of the foregoing description. Accordingly, the present invention embraces all such alternative modifications and variations as falling within the spirit and scope of the appended claims.

What is claimed is:

1. A backlight assembly comprising:
   a light source;
   a light-guide plate that guides light generated from the light source; and
   an integrally formed frame including a chassis and a mold frame integrally combined with the chassis as an indivisible unitary element, the chassis including a metal, the mold frame including a plastic, the integrally formed frame receiving the light source and the light-guide plate, a hemming part being formed on a sidewall of the chassis to increase strength of the integrally formed frame.

2. The backlight assembly of claim 1, wherein the chassis comprises a bottom plate having an opening at a central portion of the bottom plate and the sidewall extended from a side of the bottom plate in a vertical direction of the chassis, and the hemming part is bent from an upper portion of the sidewall toward the bottom plate to be overlapped with the sidewall.

3. The backlight assembly of claim 2, wherein the hemming part is formed on three sidewalls of four sidewalls defining the sidewall of the chassis except one sidewall that is adjacent to the light source.

4. The backlight assembly of claim 1, wherein the chassis comprises a bottom plate having an opening at a central portion of the bottom plate, the sidewall extended from a side of the bottom plate in a vertical direction of the chassis, and a protrusion protruded from an upper portion of the sidewall in a direction substantially parallel with the bottom plate to receive the light-guide plate.

5. The backlight assembly of claim 4, wherein the protrusion is adjacent to the light source.

6. The backlight assembly of claim 1, wherein the chassis has a plurality of holes to increase an adhesive strength between the mold frame and the chassis.

7. The backlight assembly of claim 1, wherein a user hole is formed through the sidewall of the chassis so that the chassis is combined with a case through the user hole.

8. The backlight assembly of claim 1, wherein the light source comprises a plurality of light-emitting diodes (LEDs).

9. The backlight assembly of claim 1, wherein the light source comprises at least one fluorescent lamp.

10. The backlight assembly of claim 9, wherein the chassis comprises a bottom plate having an opening at a central portion of the bottom plate, the sidewall extended from a side of the bottom plate in a vertical direction of the chassis, and a cover part extended from an upper portion of the sidewall in a direction substantially parallel with the bottom plate to cover the fluorescent lamp.

11. The backlight assembly of claim 1, wherein the chassis comprises steel electrogalvanized cold-rolled coil (SECC).

12. The backlight assembly of claim 1, further comprising:
    a reflecting sheet disposed under the light-guide plate; and
    an optical sheet on the light-guide plate.

13. A display device comprising:
    a light source;
    a light-guide plate that guides light generated from the light source;
    an integrally formed frame including a chassis and a mold frame integrally combined with the chassis as an indivisible unitary element, the chassis including a metal, the mold frame including a plastic, the integrally formed frame receiving the light source and the light-guide plate, a hemming part being formed on a sidewall of the chassis to increase strength of the integrally formed frame;
    a display panel received in the integrally formed frame on the light-guide plate to display an image based on the light exiting from the light-guide plate; and
    an adhesive member fixing the display panel to the integrally formed frame.

14. The display device of claim 13, wherein the hemming part is formed on three sidewalls of four sidewalls defining the sidewall of the chassis except one sidewall that is adjacent to the light source.

15. The display device of claim 13, wherein the chassis comprises a bottom plate having an opening at a central portion of the bottom plate, the sidewall extended from a side of the bottom plate in a vertical direction of the chassis, and a protrusion protruded from an upper portion of the sidewall in a direction substantially parallel with the bottom plate to receive the light-guide plate.

16. The display device of claim 15, wherein the protrusion is adjacent to the light source.

17. The display device of claim 13, wherein the chassis has a plurality of holes to increase an adhesive strength between the mold frame and the chassis.

18. The display device of claim 13, wherein a user hole is formed through the sidewall of the chassis so that the chassis is combined with a case through the user hole.

19. The display device of claim 13, wherein the light source comprises a plurality of LEDs.

20. The display device of claim 13, wherein the light source comprises at least one fluorescent lamp.

* * * * *